United States Patent [19]
Schmoutziguer et al.

[11] Patent Number: 6,034,342
[45] Date of Patent: Mar. 7, 2000

[54] PROCESS AND APPARATUS FOR SEPARATING PARTICLES BY USE OF TRIBOELECTRIFICATION

[75] Inventors: Willem S. Schmoutziguer, KA Arnhem, Netherlands; James J. McGovern, Jacksonville, Fla.

[73] Assignee: Carpco, Inc., Jacksonville, Fla.

[21] Appl. No.: 09/026,838

[22] Filed: Feb. 20, 1998

[51] Int. Cl.[7] .................................................. B03L 7/00
[52] U.S. Cl. ................................ 209/127.1; 209/127.4; 406/191
[58] Field of Search .......................... 209/127.1, 127.4, 209/128, 129, 130; 406/191, 193

[56] References Cited

U.S. PATENT DOCUMENTS

| | | | |
|---|---|---|---|
| 4,213,852 | 7/1980 | Etkin | 209/136 |
| 4,627,579 | 12/1986 | Rich | 209/129 |
| 5,358,119 | 10/1994 | Stahl et al. | |
| 5,542,543 | 8/1996 | Yasukuni | 209/127.1 |
| 5,885,330 | 3/1999 | Lee | 209/127.1 |

*Primary Examiner*—Donald P. Walsh
*Assistant Examiner*—Daniel Schlak
*Attorney, Agent, or Firm*—Arthur G. Yeager

[57] ABSTRACT

A process and apparatus for subjecting a mixture of two types of electrically charged particles to intense physical contact through a pneumatic transfer modified by turbulent flow and path interruptions to produce surface electrical charges on the particles, and separating the charged particles to recover particles having the same charge. Seeding with a recoverable catalyst may be used as well as forming the path of the mixture from one of the two types of electrically neutral particles. The path interruptions may be sudden directional changes, circuitous paths, baffles, induced vortices and other mechanical apparatus.

20 Claims, 5 Drawing Sheets

PROCESS AND APPARATUS FOR SEPARATING PARTICLES BY USE OF TRIBOELECTRIFICATION

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

There are many occasions when a mixture of particles of different types must be separated; for example in the recovery of ore and in the sorting of trash. The different magnetic properties of the materials may permit a separation to be accomplished by passing the particles through a magnetic field, but, when the materials are not magnetically attractive, other separation techniques are necessary. Many materials, particularly plastic materials are electrically neutral and are not affected by magnetic charging, and thus separation depending on magnetic effects is not feasible. Separation based on differences in specific gravities is also widely used where possible, but in the case of plastic materials the specific gravities of different materials are frequently too similar to form a basis for such separation. It has now been found that such electrically neutral materials may be given a temporary surface charge that is sufficiently strong and persistent to permit a separation based on the different charges received by different materials.

It is an object of this invention to provide a process and apparatus for separating mixtures of two or more types of particles of electrically neutral materials. It is another object of this invention to provide a process and an apparatus for subjecting a feed mixture of electrically neutral particles of synthetic plastic material to a series of directional changes and interparticle contacts while in turbulent flow to produce particles with temporary surface charges, and separating those particles based on their surface charges. Still other objects will become apparent from the more detailed description which follows.

SUMMARY OF THE INVENTION

This invention relates to a process and an apparatus for causing electrically neutral particles to assume a surface electrical charge and separating the surface-charged particles according to their respective charges to recover particles of like charges. The process of this invention involves causing the electrically neutral particles to assume a surface electrical charge by subjecting the particles to turbulent flow involving interparticle physical contact and sudden directional changes, subjecting the resulting surface-charged particles to an electrical field to effect a separation between particles according to their charges.

The apparatus of this invention involves a particle separator such as that of U.S. Pat. No. 5,251,762 to Taylor and Jackson wherein electrically charged particles are passed vertically between rotating cylindrical electrodes to effect a separation at the exit of the separator between particles of different charges (i.e., negative or positive charges). For purposes of this invention, the apparatus of the patent is modified to receive a feed stream of electrically neutral particles and subject them to triboelectrification sometimes called "frictional charging", to cause the particles to become temporarily frictionally charged on the surfaces of the particles, and then to be subjected to the separation process of such patent so as to produce a separation between positively and negatively charged particles.

A particularly useful apparatus for imparting surfaces charges to the electrically neutral particles is a chamber that includes turns or changes in cross section along its length. When particles are caused to flow through the pipe under turbulent flow conditions, there are numerous high speed collisions between particles which, in turn, produce surface charges on the colliding particles, and it is these charges which are sufficient to permit a separation to be made in an apparatus such as that of the aforesaid U.S. Pat. No. 5,251,762. Where practical, the chamber preferably will have a chemical structure the same as the chemical structure of one of the constituents of the colliding particles. If that is impractical, the ratio of constituents in the mixture of colliding particles may be altered by "seeding" or adding solid particles used as a catalyst to further influence charging of the particle stream. The catalyst may be removed, prior to the physical separation of the electrically neutral particles, allowing it to be reused. The power to produce the turbulent flow in the particle stream may be produced by positive pressure behind the particle stream or by inducing a vacuum ahead of the particle stream.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE INVENTION

Figure 1:
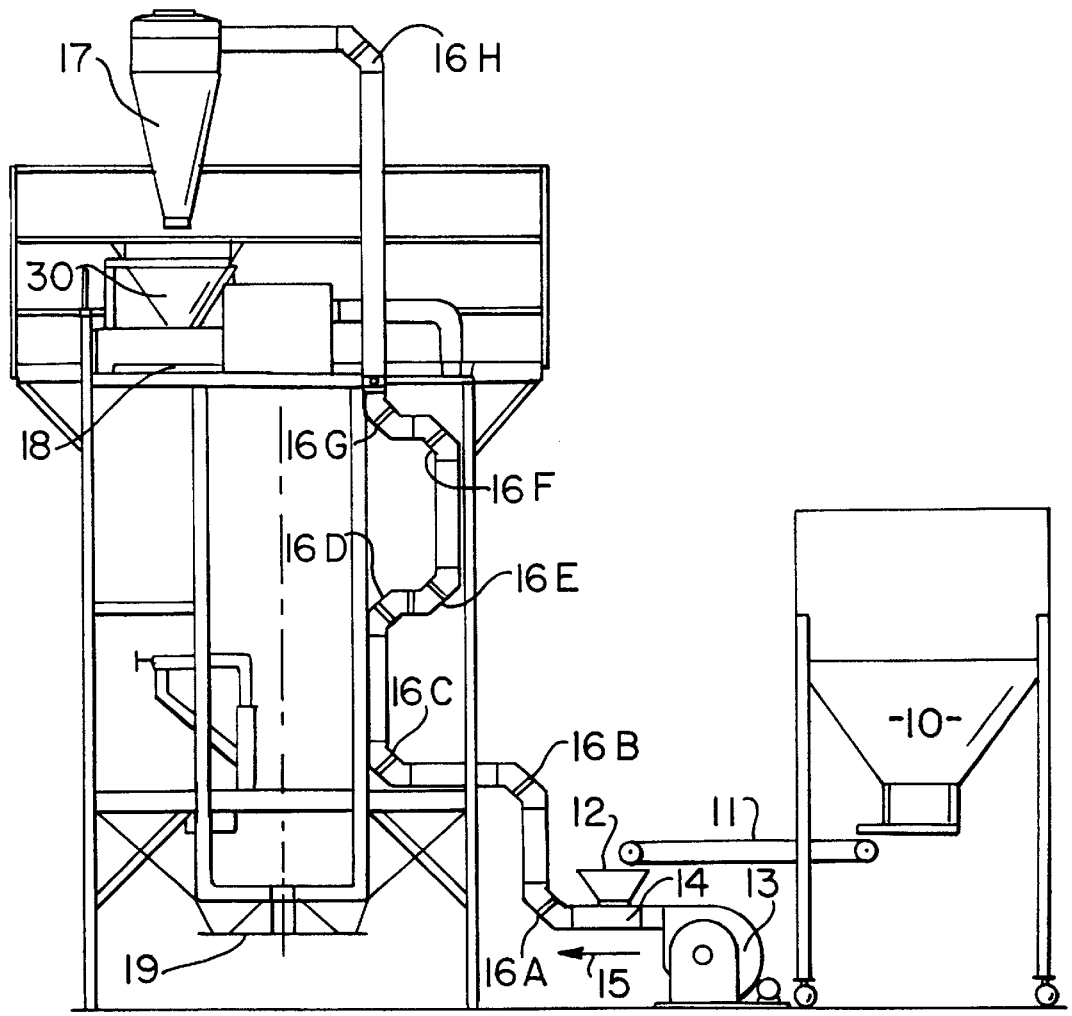
FIG. 1 is a front elevational view of a particle separator fitted with blower means to produce turbulent flow within a stream of electrically neutral particles so as to produce surface electrical charges on the particles just prior to subjecting the particles to an electrostatic separation to separate charged particles of one type from charged particles of another type, in accord with a first embodiment of this invention.

This invention is shown in detail in the accompanying drawings. In FIG. 1 there is shown storage hopper 10 movable so as to be able to deposit particles of electrically neutral material, e.g., plastic sheeting broken into particles, carpet material, etc., onto moving table or belt 11, which, in turn, directs those particles into feed hopper 12. Blower 13 directs pressurized air through chamber or conduit 14 in the direction of arrow 15 carrying along the particles dropped into conduit 14 from feed hopper 12. Conduit 14 passes through a series of generally right angle turns 16 A-H before emptying into a centrifugal separator 17 which discharges the charged electrically neutral particles into hopper 30 at the top of an electrostatic separator similar to that of U.S. Pat. No. 5,251,762 and recovers at the lower end thereof a separation between the charged particles and the uncharged particles. The flow of particles and air through conduit 14 must be turbulent and there must be sufficient right hand turns 16 in conduit 15 to produce temporary surface charging of such particles. Turbulent flow conditions generally exist when the flow is not streamlined and frequently is measured by reference to a Reynolds Number, well known in fluid flow calculations.

The size of the chamber or conduit 14 and the number of turns or cross sectional changes are not critical except to the extent that the particles exiting from the chamber must exhibit electrical charges on the particle surfaces. These charges are temporary in that the charges do not persist when the material is at rest. The charges are developed by collisions with other particles in a fluid flow system, particularly when that flow is in a form known as "turbulent flow" to engineers proficient in fluid flow mechanics. When such a condition exists the particles in the turbulent flow system assume surface electrical charges that can be used to separate charged particles from uncharged particles.

Figure 2:
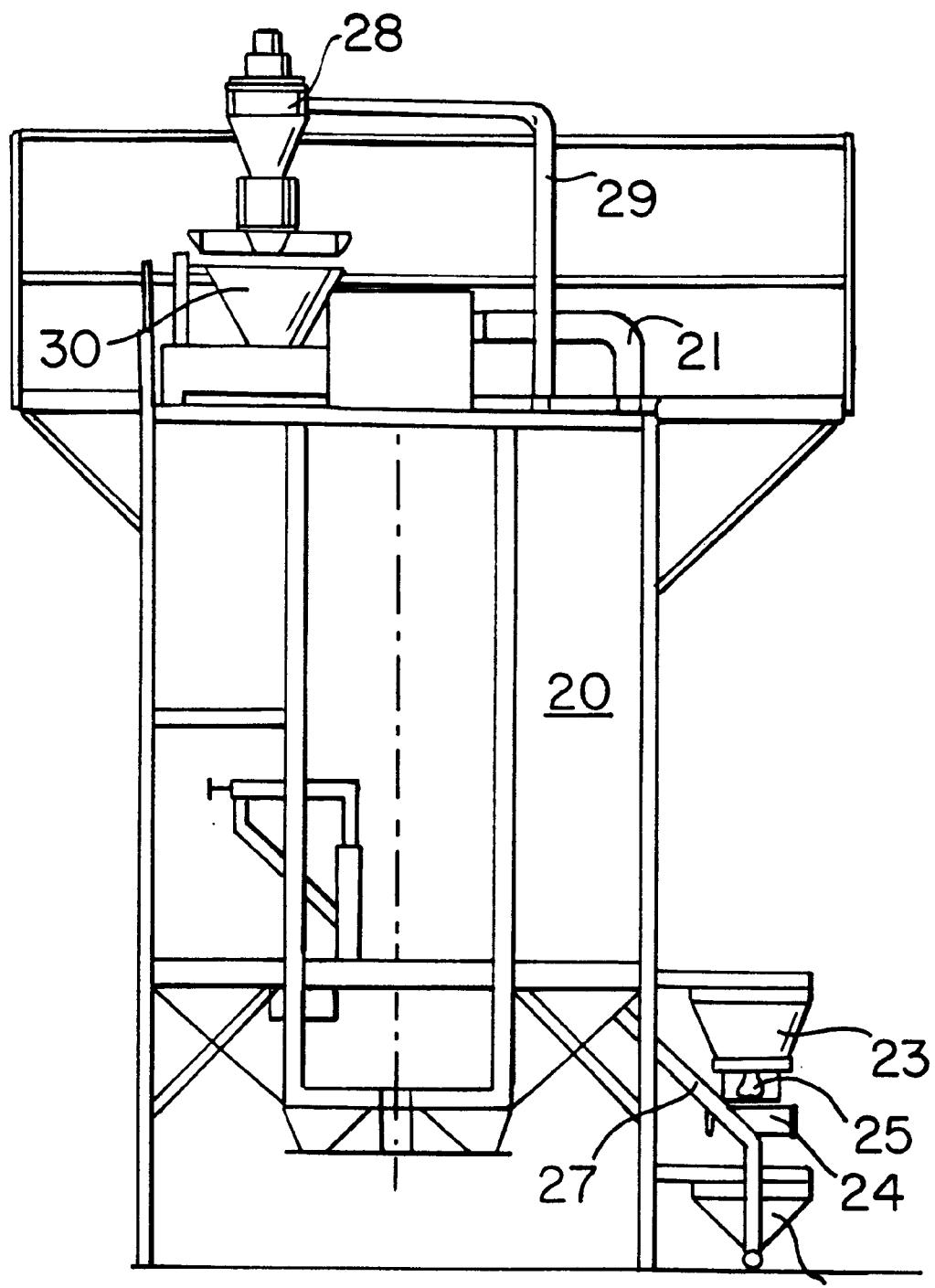
FIG. 2 is a front elevational view of a particle separator fitted with a vacuum means to produce turbulent flow within a stream of electrically neutral particles so as to produce surface electrical charges on the particles just prior to subjecting the particles to an electrostatic separation to separate charged particles of one type from charged particles of another type, in accord with a second embodiment of this invention.
Figure 3:
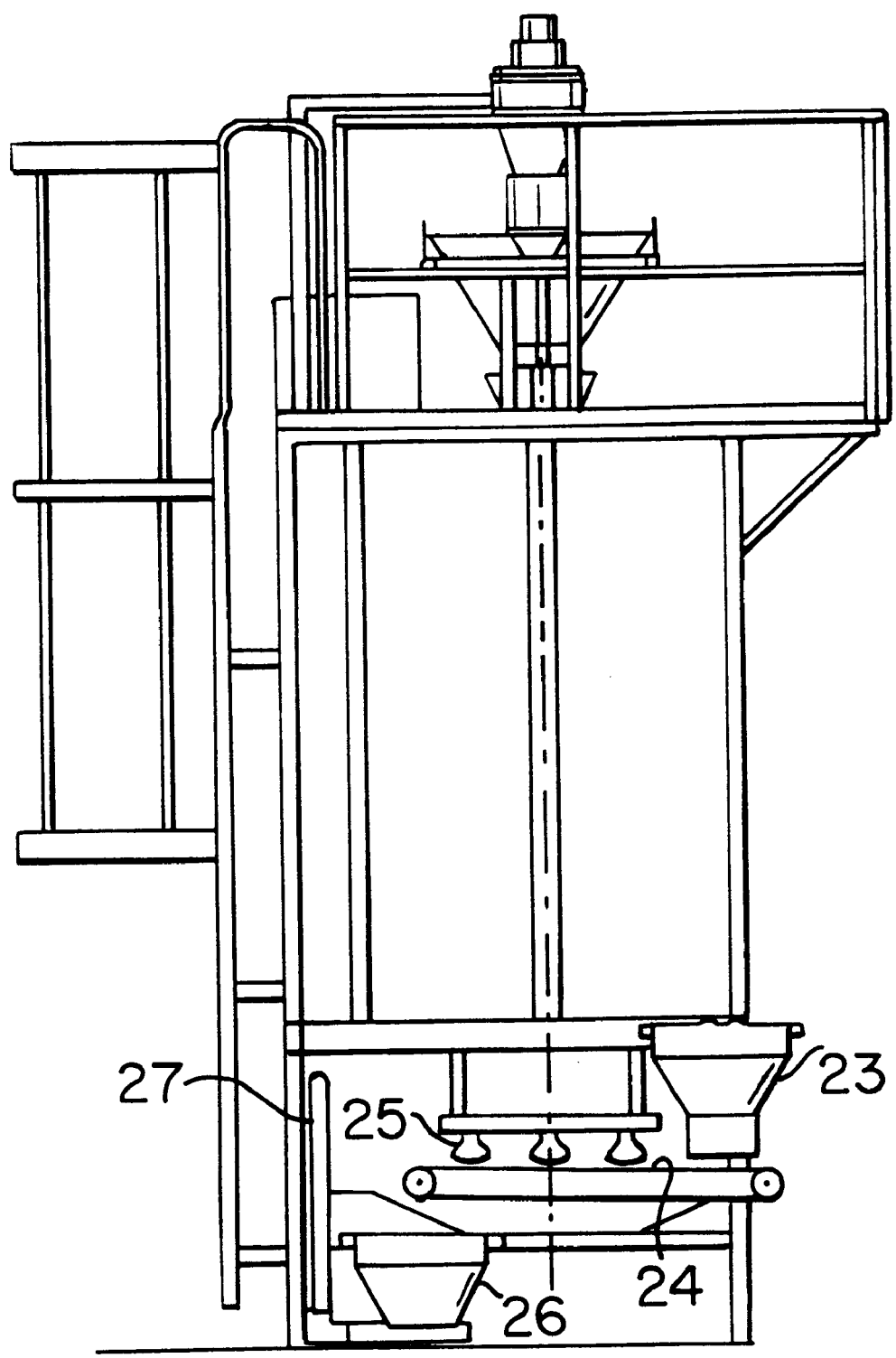
FIG. 3 is a side elevational view of the separator of FIG. 2.

In FIGS. 2 and 3 there are shown features of a system similar to that described above except that the particles are not motivated by the pressure of a blower but are motivated by being subjected suddenly to an evacuated chamber. In FIGS. 2 and 3 a vacuum chamber 20 is connected by pipe 21 to a dehumidifying chamber 22. The particulate feed enters from hopper 23 to belt 24 and passes under heat lamps 25 to a receiver 26 until ready for loading into chamber 20. When it is time to feed particles into chamber 20 it is done by suction through line 27. Suction pump 28 maintains a vacuum in chamber 20 through line 29 and to connections thereto. When surface charging has been completed the particles are fed through hopper 30 into the top of an electrostatic separator such as that of U.S. Pat. No. 5,251, 762, which separated particles being recovered from the discharge end of that separator.

Figure 4:
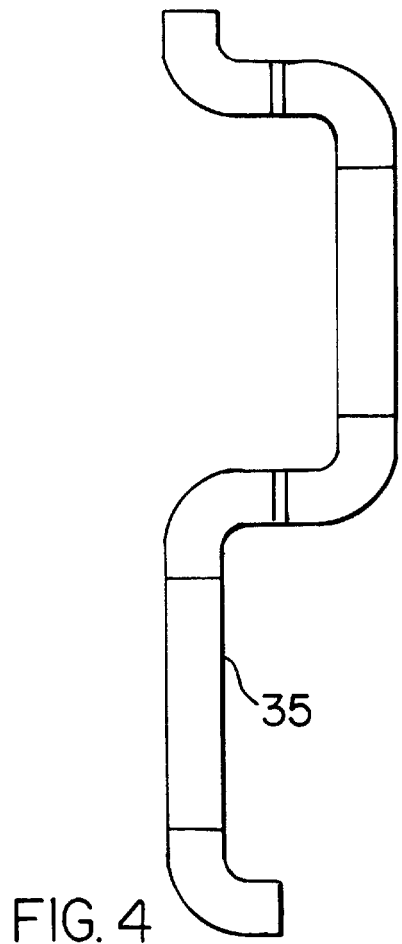
FIG. 4 is a side elevational view of a pre-charging apparatus similar to that depicted in FIG. 1.

FIG. 4 depicts the most common and preferred apparatus for charging the particles. The conduit 35 is similar to conduit 14 of FIG. 1 that is bent in several places along its length to produce a number of generally right angle turns. The size of the pipe and the number of turns are not critical except to the extent that the particles exiting from the pipe must exhibit electrical charges on their surfaces.

Figure 6:
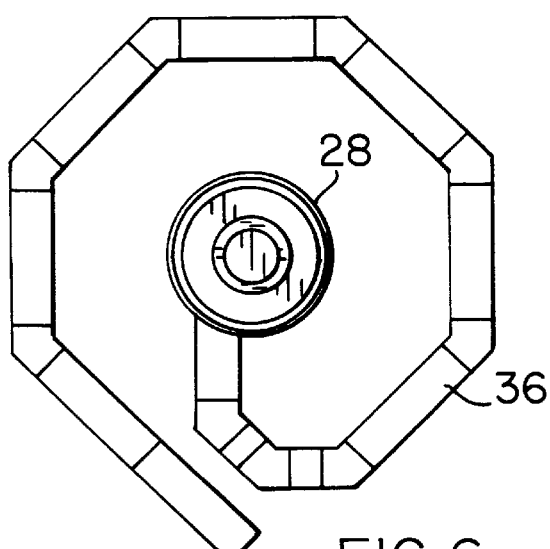
FIG. 6 is a top plan view of the apparatus of FIG. 5.
Figure 5:
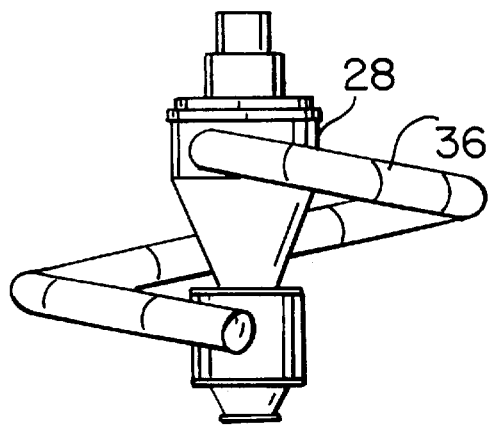
FIG. 5 is a side elevational view of a pre-charging apparatus surrounding a vacuum, in accord with a third embodiment of this invention.

FIGS. 5 and 6 depict another pre-charging apparatus in which a conduit 36 that is bent in several places along its length to produce a number of turns. The size of the pipe and the number of turns are not critical except to the extent that the material exiting from the pipe must exhibit electrical charges on its surface. This apparatus may be used where frequent cleaning of the apparatus is required and disassembly is impractical. This conduit 36 may be required when, for example, the mixture of electrically neutral particles also contains a conductive contaminant. While providing sufficient, though not necessarily optimal pre-charging, this configuration facilitates cleaning to remove conductive coating of the interior of conduit 36. Some electrically neutral streams may contain conductive contaminants which over a period of time may coat the pre-charging apparatus, thus diminishing its effectiveness. The conduit 36 will provide turbulent flow regimes at the same time the shallow angle turns allow for manual cleaning without disassembly.

Figures 7, 8:
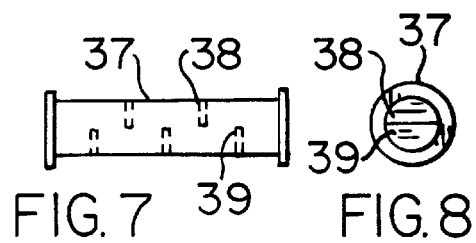
FIG. 7 is a side elevational view of a baffled pre-charging apparatus in accord with a fourth embodiment of this invention.
FIG. 8 is an end elevational view of the apparatus of FIG. 7.

FIGS. 7 and 8 depict an elongated conduit 37 that has several internal baffles 38, 39 spaced along the length thereof. The baffles provide flow interruptions and abrupt changes of direction and enhance contact charging of the particles. The size of the pipe, number of baffles and baffle spacing is not critical except to the extent that the particles exiting from the conduit must exhibit electrical charges on their surfaces. The baffles 38, 39 require the particles to repeatedly and rapidly change both direction and velocity in a short distance. These baffles 38, 39 significantly increase drag in the conveying system and would likely be advantageous only in applications where space is limited.

Figure 9:
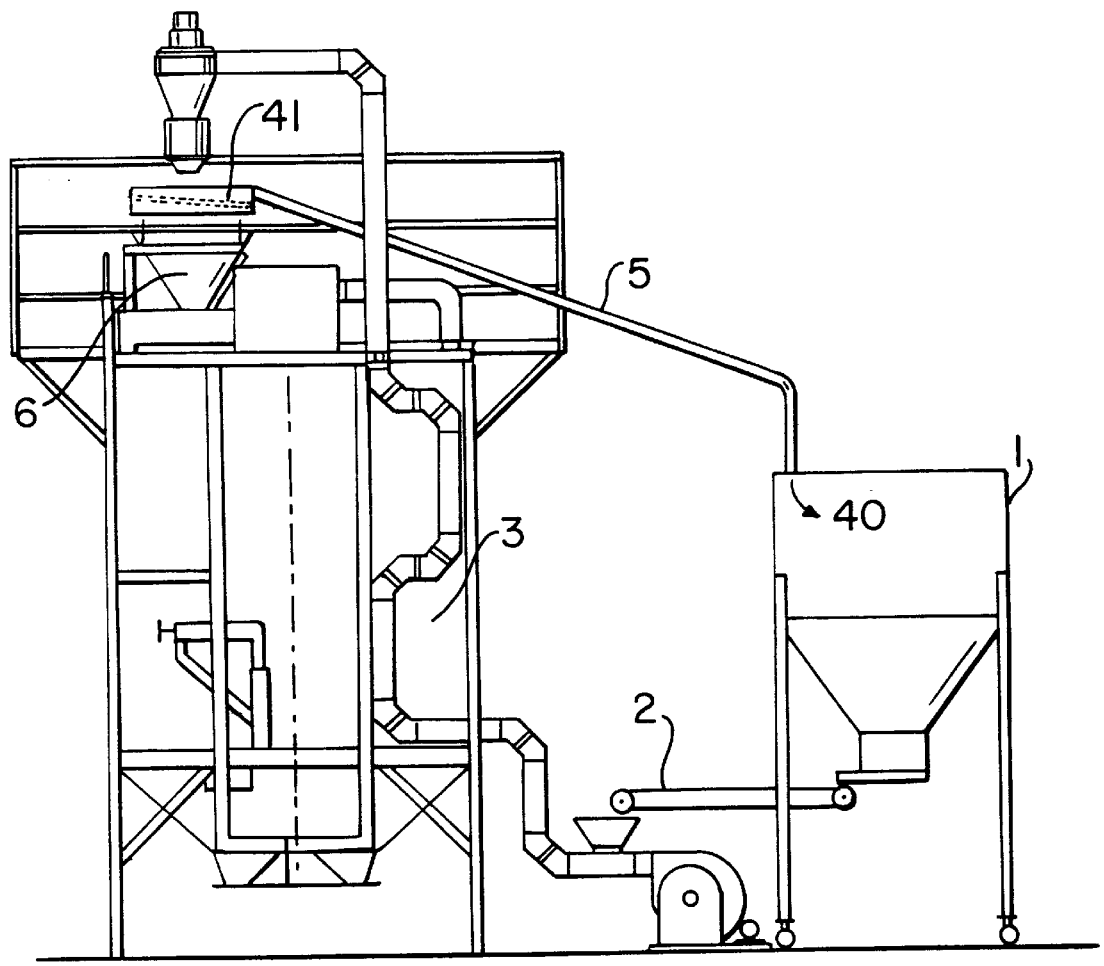
FIG. 9 is a front elevational view of a particle separator similar to FIG. 1 and having a catalyst being added to "seed" the particle stream of electrically neutral particles, in accord with a fifth embodiment of this invention.

FIG. 9 depicts an enhancement to that described in FIG. 1 except that the pellets 40 are added to the particle stream. Pellets 40 are added to the particulate feed in hopper 1. The particulate feed and pellets are blended as it moves through the conveying system 2 and 3. When surface charging has been completed the mixture of pellets and particles are separated by a screen 41. The pellets 40 are, for example, screened at 41 for reuse through the return pipe 5 to feed hopper 1. The charged particles are fed through hopper 6 into the top of an electrostatic separator such as that of U.S. Pat. No. 5,251,762 which separated particles being recovered from the discharge end of that separator. The pellets 40 are of the same chemical composition as one of the particle stream's constituents. The particle size within the stream of electrically neutral particles is by design different than the size of the pellets 40. The size differential facilitates separation, as by screen 41, of the pellets 40 from the stream once a surface charge has been induced on the particles to be separated.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

We claim:

1. A process for separating a mixture of different electrically neutral particles which comprises subjecting the mixture of particles to turbulent flow with air through an enclosed space wherein the space is enclosed by walls and the walls having a chemical structure the same as the chemical structure of one of the principal constituent particles of the mixtures recovering the mixture of particles having surface electrical charges thereon; and subjecting the surface charged particles to an electrostatic separation procedure to separate positively charged particles from negatively charged particles.

2. The process of claim 1 wherein the turbulent flow is effected, at least in part, by abruptly changing the direction of flow of the particles in the enclosed space.

3. The process of claim 1 wherein the enclosed space is a pipe and the turbulent flow is produced by directing the particles suspended in air through the pipe having a series of successive directional changes, the turbulent flow being produced by a fan blowing air at a velocity into the pipe.

4. The process of claim 1 wherein the turbulent flow is produced by providing a vacuum at an exit from the enclosed space and causing the particles to flow from an entrance of the enclosed space through a zone of directional changes while flowing to the exit.

5. The process of claim 1 wherein the turbulent flow is produced by a plurality of spaced baffles located across the flow direction of the particles in the enclosed space causing the particles to abruptly change direction during flow.

6. A process for separating a mixture of different electrically neutral particles which comprises subjecting the mixture of particles to turbulent flow through an enclosed space wherein the space is enclosed by walls having a chemical structure substantially the same as the chemical structure of one of the principal constituent particles of the mixture; recovering the mixture of particles having surface electrical charges thereon; and subjecting the surface charged particles to an electrostatic separation procedure to separate positively charged particles from negatively charged particles.

7. The process of claim 6 wherein the turbulent flow is effected, at least in part, by abruptly changing the direction of flow of the particles in the enclosed space.

8. The process of claim 6 wherein the turbulent flow is produced by directing the particles suspended in air through a pipe having a series of successive directional changes, the turbulent flow being produced by a fan blowing air at a velocity into the pipe.

9. The process of claim 6 wherein the turbulent flow is produced by a vacuum at an exit from the enclosed space and causing the particles to flow from an entrance of the enclosed space through a zone of directional changes while flowing to the exit.

10. The process of claim 6 wherein the turbulent flow is produced by a plurality of spaced baffles located laterally of the flow direction of the particles in the enclosed space causing the particles to abruptly change direction during flow.

11. The process of claim 6 further comprising seeding the mixture with other particles of one type chemical structure in the mixture.

12. The process of claim 11 wherein the other particles raise the one type to be a principal constituent of the mixture.

13. A process for separating a mixture of different electrically neutral particles which comprises seeding the mixture with other particles of one type chemical structure in the mixture to raise such one type to be a principal constituent of the mixture, subjecting the mixture of all particles to turbulent flow to provide surface charges thereon; recovering the other particles and the mixture of particles having surface electrical charges thereon; and subjecting the surface charged particles to an electrostatic separation procedure to separate positively charged particles from negatively charged particles.

14. The process of claim 13 wherein the other particles are sized larger than the constituent particles of the mixture and are recovered by size classification after constituent particles in the mixture gain surface electrical charge.

15. The process of claim 13 wherein the other particles are introduced in a feed hopper with the mixture and conveyed through the turbulent flow with air.

16. The process of claim 13 wherein subjecting the mixture of all particles to turbulent flow is with air through a space enclosed by walls.

17. The process of claim 16 wherein the turbulent flow is effected, at least in part, by abruptly changing the direction of flow of the particles in the enclosed space.

18. The process of claim 16 wherein the enclosed space is a pipe and the turbulent flow is produced by directing said particles suspended in air through pipe having a series of successive directional changes, the turbulent flow being produced by a fan blowing air at a velocity into the pipe.

19. A process of claim 16 wherein the turbulent flow is produced by providing a vacuum at an exit from the enclosed space and causing the particles to flow from an entrance of the enclosed space through a zone of directional changes while flowing to the exit.

20. The process of claim 16 wherein the turbulent flow is produced by a plurality of spaced baffles located across the flow direction of the particles in the enclosed space causing the particles to abruptly change direction during flow.

* * * * *